July 20, 1954 N. M. BROWN, JR., ET AL 2,684,459

FAIL SAFE REBALANCEABLE BRIDGE CONTROL SYSTEM

Filed Oct. 9, 1950

Norman M. Brown Jr.
Clifford A. Shank

INVENTORS,

BY [signature]

ATTORNEY

Patented July 20, 1954

2,684,459

UNITED STATES PATENT OFFICE 2,684,459

FAIL SAFE REBALANCEABLE BRIDGE CONTROL SYSTEM

Norman M. Brown, Jr., Los Angeles, and Clifford A. Shank, Redondo Beach, Calif., assignors to The Garrett Corporation, Los Angeles, Calif., a corporation of California Application October 9, 1950, Serial No. 189,156

15 Claims. (Cl. 318—29)

The present invention relates generally to remote control means, and is more particularly concerned with those types of positioning systems for the actuation of remote devices, which are controlled by means of Wheatstone bridge circuits.

The mechanism of the present system is susceptible of general application, and is particularly useful in connection with aircraft, where an inaccessible remotely located device may readily be selectively controlled from an accessible central or local station.

In its broad concepts, the present invention contemplates an improved control mechanism for remotely located devices, which permits the utilization of electronic emission devices such as vacuum tubes, which enable the control currents to be readily amplified for normal operation, and the utilization of overriding controls for rendering the normal operation inactive upon the occurrence of certain circuit faults.

With the foregoing in mind, it is one object of the herein described invention to provide remote control mechanism utilizing Wheatstone bridge circuits and electron emission devices, which is more reliable in operation than the presently known systems.

A further object of the invention is to provide an overriding fail-safe circuit in connection with remote control mechanism, which will render the normal controls inactive and prevent operation of the remote device actuator to the full limit of its operation, which would be very undesirable and in some cases even disastrous.

Another object of the invention resides in the provision of a novel protective circuit which is so arranged as to protect the mechanism against abnormal operation due to predetermined abnormal circuit conditions, such as open circuits and short circuits.

Further objects of the invention will be brought out in the following part of the specification, wherein detailed description is for the purpose of fully disclosing several embodiments of the invention without placing limitations theron.

Referring to the accompanying drawings, which are for illustrative purposes only:

Figure 1:
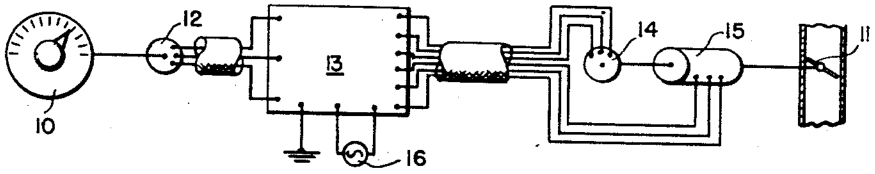
Fig. 1 is a view schematically representing a typical remote positioning system embodying control mechanism according to the present invention.

Referring now to the drawings, Fig. 1 schematically shows the typical installation of a remote control mechanism embodying the features of the present invention. The usual arrangement comprises a central or local control station having some form of selector as generally indicated at 10 which may be graduated to indicate various positions of a remotely located device which in the present instance has been illustrated for purposes of description as consisting of a butterfly valve 11. The local and remote stations are interconnected by operating devices and circuits which will be hereinafter described in detail, such that selective movements of the selector will be transmitted to and actuate the remote device to the desired position selected.

Briefly, the selector 10 actuates a positioner 12 which is connected to an electronic modification unit 13 which is in turn connected to a follow-up 14 and motor 15. Operating current is supplied to the modification unit 13 from a suitable power source 16.

Figures 2, 3, 4:
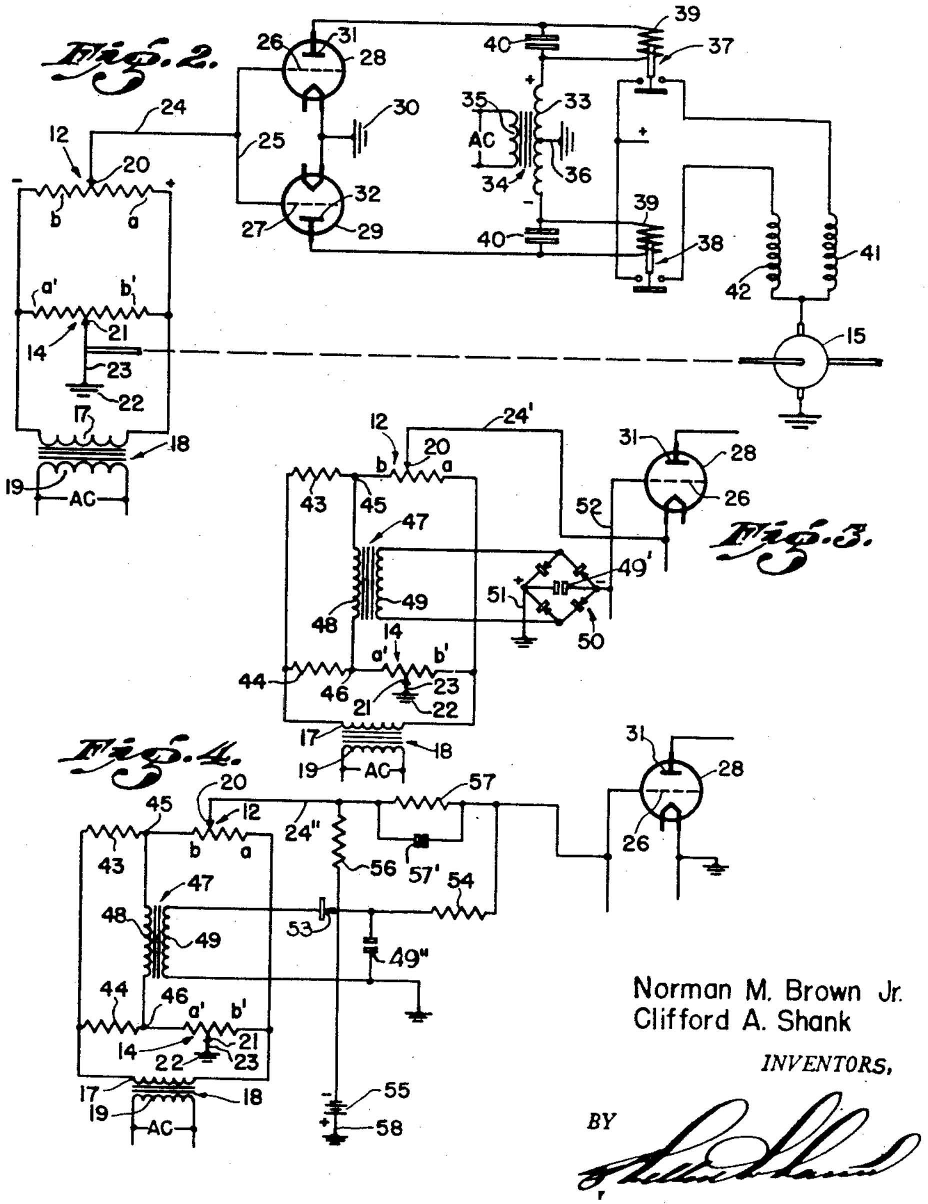
Fig. 2 is a schematic wiring diagram of remote control mechanism according to the present invention.
Fig. 3 is a circuit diagram modified according to the present invention and illustrating schematically one form of fail-safe circuit in connection therewith.
Fig. 4 is a similar view schematically illustrating another form of fail-safe circuit arrangement in connection with the invention.

More specifically, as shown in Fig. 2, the relationship and interconnection between the various parts of the mechanism as basically embodied in the present invention are shown and illustrated schematically. The positioner 12 and follow-up 14 comprise variable resistors in the form of potentiometers which are connected in parallel relation to form the parallel paths of a Wheatstone bridge.

Input to the bridge is supplied from the secondary winding 17 of a transformer 18, the primary 19 of which is connectible with a suitable alternating current source of supply. Output connections to the bridge are formed by brush contacts 20 and 21 respectively, these contacts separating the selector and follow-up potentiometers into section *a*, *b*, and *a'* and *b'* which form the respective arms of the Wheatstone bridge.

The output circuit of the Wheatstone bridge is connected with electronic controls for the motor 15. For such purpose, the contact 21 is connected to ground 22 by a conductor 23. The contact 20 is connected through conductor 24 and branching conductor 25 with the grid electrodes 26 and 27 of the triode tubes 28 and 29. The cathodes of these tubes are connected to ground as indicated at 30. While the contact 20 is illustrated as being directly connected to the grids of these tubes, it will be readily appreciated that such connection may, if desired, be made to an amplifying circuit, not shown.

The plate electrodes 31 and 32 are connected into an output circuit containing a secondary winding 33 of a transformer 34 having its primary 35 arranged for energization from a suitable alternating current power source. The transformer secondary 33 is grounded at its electrical center through a ground connection 36.

Control relays 37 and 38 have operating coils 39 connected into the plate circuit on opposite sides of the transformer secondary 33, these operating coils being bridged in each case by a condenser 40. The contacts of the relays 37 and 38 are arranged upon closing to respectively energize operating windings 41 and 42 for reversing the direction of operation of the motor 15, one of these windings actuating the motor in a clockwise direction and the other in a counter-clockwise direction.

The frequency of the alternating current supply to transformer 18 and transformer 34 should be the same, and the connection of the relays 37 and 38 to the motor will necessarily have to be coordinated depending upon the phase relationship of the Wheatstone bridge circuit and the plate circuit of the tubes 28 and 29.

In order to explain the operation of the arrangement disclosed in Fig. 2, let it be assumed that the instantaneous voltages are such that the right end of the selective potentiometer is positive and the left end is negative at the same time that the upper end of the secondary winding 33, of transformer 34, is positive and the lower end is negative. Under such conditions, with the contacts 20 and 21 at the mid-points of the potentiometers, the Wheatstone bridge will be balanced and there will accordingly, under said conditions, be no flow of current in the output circuit from these contacts. The direction of current flow in the output circuit will then depend on whether the contact 20 is moved to the right or to the left from balanced position of the bridge. If the contact 20 is moved toward the right, under the assumed conditions, the contact 20 becomes more positive and the grids 26 and 27 will have a positive potential at this instant. The plate 31 of the tube 28 being positive at this time, tube 28 will be rendered conductive so that current will flow through the operating coil 39 of relay 37 and cause it to close its contacts to energize winding 41 of the motor 15 and operate it in such direction as to move the brush 21 to a position wherein a balanced condition of the bridge will be restored.

Since the plate 32 of tube 29 will be at negative potential, this tube will be non-conductive so that the operating coil 39 of relay 38 will not be energized and its contacts will therefore remain open. Upon reversal of the current in the selector potentiometer and the secondary 33 of the transformer 34, the tube 28 becomes nonconductive for the reason that its plate and grid are both negative, and the tube 29 is likewise non-conductive for the reason that its grid is also negative although the plate 32 is positive. It will therefore be apparent that during one half cycle, the relay 37 will be supplied with current to retain it in closed position. Upon movement of the contact 20 to the left from a balanced position, the operation of tubes 28 and 29 will be reversed so that only relay 38 will be energized and close its contacts to excite the motor through its winding 42 and restore a balanced condition to the bridge.

While the arrangement shown in Fig. 2 operates very satisfactorily to control the remote device under normal operating conditions, the arrangement is not protected against circuit faults. For example, it will be seen that a break or open in the ground connection 23 will cause full voltage, which now exists by virtue of the capacity to ground of the power source, to be applied to the grids 26 and 27. The motor 15 will thus be caused to run the connected device to one extreme limit of operation or the other regardless of the position of the selector potentiometer. Likewise, if the conductor 24 opens at a point distal of the tube grids, the portion of the conductor between the grids and the open circuit will be subject to stray currents and may thus energize the tubes so as to cause the motor 15 to actuate the conductive device at random. Further, if an abnormal unbalanced condition of the bridge should occur as by circuit grounds or open circuits, other than described above, the motor will be energized and may be actuated to move the connected device to undesired positions.

In order to overcome these situations and provide for fail-safe operation upon the occurrence of faults, the simplified arrangement of Fig. 2 has been modified as shown in Figs. 3 and 4, which will now be explained.

In the arrangement shown in Fig. 3, the basic Wheatstone bridge as previously described has been amplified to include additional resistors 43 and 44 which are correlated with the selector potentiometer and the follow-up potentiometer previously described to form a second or auxiliary Wheatstone bridge having an output circuit connected between points 45 and 46 such that zero potential exists normally or during balanced bridged conditions.

Should any bridge unbalance occur by reason of grounded conductors or because of an open circuit other than in conductors 24′ and 23, a potential will be manifest across the points 45 and 46. This potential is utilized to accomplish fail-safe operation. As illustrative of one manner of utilizing the unbalanced potential, a step-up transformer 47 is connected with its primary 48 connected in the output circuit of the second Wheatstone bridge and its secondary 49 connected to the input of a bridge rectifier, as generally indicated at 50. The output circuit of the bridge rectifier is shunted by a bypass capacitor 49′ and has its positive side grounded at 51 and its negative connected by a conductor 52 to the grid or grids of the control tubes.

In the arrangement just described it will be noted that the contact 20 is here connected by conductor 24′ to the tube cathode rather than to the control grid as in the arrangement of Fig. 2. Thus, an open circuit in conductors 24′ or 23 effectively isolates the bridge from the tube due to physically opening the cathode circuit, the tube in this case being actually cut off and being rendered inoperative.

The potentiometers 12, 14 in this arrangement still function to control the direction and extent of operation of the motor 15 but normally the variations of the potentiometers are ineffectual to cause unbalance of the auxiliary or second Wheatstone bridge in which the potentiometers comprise non-variable elements. That is, the total resistance of the potentiometer is not changed by movement of its sliding contact. However, in the event that an unbalanced potential occurs in the output circuit of the second Wheatstone bridge between points 45 and 46, a negative potential will be applied to the connected tube grids of such magnitude as to drive the tube to cut off regardless of any other bridge signal applied to the tube. This overriding control thus renders the normal control ineffectual and stops further movement of the remotely connected device by the motor 15.

In some installations it may not be desirable or feasible to connect the Wheatstone bridge in the cathode circuit in the manner previously explained. In such cases, the modified arrangement as disclosed in Fig. 4 may be utilized. In general, the Wheatstone bridge arrangement is the same as explained in connection with the arrangement disclosed in Fig. 3.

The potentiometers in the arrangement of Fig. 4, it will be noted, still operate to control the operation of motor 15. Likewise, protection is provided against an open circuited or grounded bridge circuit, except with respect to conductors 23 and 24''. As before, the output circuit of the auxiliary bridge is connected with transformer 47, and the output of the secondary 49 of this transformer is rectified by rectifier 53 and fed as a negative-to-ground D. C. voltage through a resistor 54 to the grid of the electron tube of the motor control. A capacitor 49'' is connected across the secondary 49 to bypass harmonics and transients. This overriding negative potential applied to the tube will drive this tube to cut off and render the normal control ineffectual as previously described.

The protection which is thus afforded due to an unbalanced condition of the auxiliary Wheatstone bridge, is not effective to provide protection in the event that the conductor 23 or conductor 24'' becomes open circuited. Protection against such a fault is accomplished in this arrangement by providing additional auxiliary means which will be energized to isolate the Wheatstone bridge circuit, when one of the conductors 23 or 24'' opens. For such purpose, a suitable negative voltage source, such as a battery 55, is connected into a high impedance circuit which applies negative voltage through a voltage dropping resistor 56 and resistor 57 to the grids of the electron tubes. A capacitor 57' connected around the resistor 57 provides a normal control path from the potentiometers, while the high resistance 57 acts as an isolating impedance for the D. C. voltage applied to the tube grid from the rectifier. The positive side of the battery 55 is grounded as indicated at 58.

The high impedance circuit just described is normally shunted by a relatively low impedance circuit through the associated Wheatstone bridge as follows: conductor 24'', contact 20, selective potentiometer 12, follow-up potentiometer 14, contact 21, and thence through conductor 23 to the ground. The negative voltage of the battery 55 is therefore normally ineffectual. When, however, either of the conductors 24'' or 23, or parts of the bridge constituting the auxiliary low impedance circuit, develops an open circuit, then the voltage drop across the resistor 56 is materially decreased with the result that substantially the full voltage of battery 55 is applied to the grid of the tube so as to bias the tube to cut-off and thereby isolate the bridge circuit and render normal actuation ineffectual.

Although a battery 55 has been described as a source of negative voltage in this arrangement, it will be appreciated that other negative sources may be utilized, such as a rectified alternating current.

It should be noted that the sliding contacts 20 and 21 are in effect extensions of conductors 24, 24', 24'' and 23. If one of the contacts should be lifted by dirt or other foreign matter, this would in effect be the same as causing an open circuit in the conductors 23 or 24, 24', 24'' as the case may be.

We claim:

1. Remote control mechanism, comprising: an actuator for moving a remotely positioned device; a Wheatstone bridge having parallel flow paths connected between their ends to a bridge output circuit; impedance elements in the respective arms of said Wheatstone bridge, one of the elements in one of said flow paths constituting a selector potentiometer having a variable contact, and one of the elements in the other flow path constituting a follow-up potentiometer having a variable contact driven by said actuator; first control means for said actuator responsive to the coaction of said potentiometers and including electron emission means having cathode and grid electrodes connected with said potentiometer contacts; and an overriding control network including a bridge rectifier having an input circuit inductively connected with said Wheatstone bridge output circuit, and a direct current output circuit having its positive side connected with the follow-up potentiometer contact and its negative side connected with said grid electrode; and a connection between the cathode electrode and said selector potentiometer contact.

2. Remote control mechanism, comprising: an actuator for moving a remotely positioned device; a Wheatstone bridge having parallel flow paths connected between their ends to a bridge output circuit; impedance elements in the respective arms of said Wheatstone bridge, one of the elements in one of said flow paths constituting a selector potentiometer having a variable contact and one of the elements in the other flow path constituting a follow-up potentiometer having a variable contact driven by said actuator; first control means for said actuator responsive to the coaction of said potentiometers and including electron emission means having cathode and grid electrodes operatively connected with said potentiometer contacts; and an overriding control network including a bridge rectifier having an input circuit inductively connected with said Wheatstone bridge output circuit, and an output circuit connected with said cathode and grid electrodes.

3. Remote control mechanism, comprising: an actuator for moving a remotely positioned device; a potentiometer for selectively determining operation characteristics of said actuator; a potentiometer connected to said actuator; a Wheatstone bridge having four arms, an output circuit for said bridge, two of said arms being formed by said two potentiometers; first control for normally controlling the operation of said actuator in accordance with settings of said selective potentiometer including electron emission means having a cathode and grid in an input circuit connected between said potentiometers; and overriding control means connected to said bridge output circuit including a D. C. potential source energizable upon occurrence of bridge unbalance, said source having its negative side connected to said grid.

4. Remote control mechanism, comprising: an actuator for moving a remotely positioned device; a potentiometer for selectively determining operation characteristics of said actuator; a potentiometer connected to said actuator; a Wheatstone bridge having four impedance elements including said two potentiometers, an output circuit for said bridge; first control for normally controlling the operation of said actuator in accordance with settings of said selector potentiometer, including electron emission means having a cathode and grid in an input circuit connected between said potentiometers; and overriding control means including a control circuit connected to said bridge output circuit for applying a negative potential to said grid upon occurrence of bridge unbalance so as to render the electron emission means non-conductive.

5. Remote control mechanism, comprising: an actuator for moving a remotely positioned device; a potentiometer for selectively determining operation characteristics of said actuator; a potentiometer connected to said actuator; a Wheatstone bridge including said two potentiometers, an output circuit for said bridge; first control for normally controlling the operation of said actuator in accordance with settings of said selective potentiometer, including electron emission means having an input circuit connected across said potentiometers; and overriding control means connected to said output circuit effective upon unbalance of said bridge for applying a control voltage to said electron emission means of such polarity as to render it non-conductive.

6. Remote control mechanism, comprising: an actuator; a Wheatstone bridge having parallel flow paths connected between their ends to a bridge output circuit; a potentiometer and an impedance element in each of said paths, one of said potentiometers constituting a selector element, and the other potentiometer constituting a follow-up element driven by said actuator; first control means responsive to the coaction of said potentiometers for controlling the direction and extent of operation of said actuator; and means connected to said bridge output circuit for overriding said first control means and rendering it ineffectual, upon current flow in said bridge output circuit.

7. Remote control mechanism, comprising: an actuator for moving a remotely positioned device; a potentiometer for selectively determining operation characteristics of said actuator; a potentiometer connected to said actuator; a first Wheatstone bridge including said potentiometers and having a first output circuit bridging said potentiometers; control means connected to said first output circuit for normally controlling the operation of said actuator in accordance with settings of said selector potentiometer; impedance elements forming with said potentiometers a second Wheatstone bridge having a second output circuit; and control means connected with said second output circuit for modifying said first control means upon the occurrence of an unbalanced condition of said second Wheatstone bridge.

8. Remote control mechanism, comprising: an actuator for moving a remotely positioned device; a selector potentiometer variable to selectively determine operation characteristics of said actuator; a follow-up potentiometer connected to and varied in response to the operation of said actuator; first control means responsive to the coaction of said potentiometers for normally initiating and terminating the operation of said actuator; a Wheatstone bridge with respect to which said potentiometers form two arms comprising non-variable elements; and overriding control means operative in response to an unbalance of said Wheatstone bridge for rendering said first control means ineffective.

9. Remote control mechanism, comprising: a motor for moving a remotely positioned device; a selector potentiometer; a potentiometer connected to said motor; a Wheatstone bridge having an output circuit and having two arms formed by said potentiometers arranged to be energized from an alternating current source; control means for said motor including an electronic emission means having an input circuit and an output circuit, the input circuit being connected between said potentiometers; means energizing said output circuit from an alternating current source; motor control relays in said output circuit selectively operable to energize and deenergize said motor in accordance with the actuation of said potentiometers; and means connected to said bridge output circuit activated in response to bridge unbalance due to a circuit fault for overriding and rendering said control means ineffectual for further control of said motor.

10. Remote control mechanism, comprising: an actuator for moving a remotely positioned device; a Wheatstone bridge having parallel flow paths connected between their ends to a bridge output circuit; impedance elements in the respective arms of said Wheatstone bridge, one of the elements in one of said flow paths constituting a selector potentiometer, and one of the elements in the other flow path constituting a follow-up potentiometer driven by said actuator; first control means for said actuator responsive to the coaction of said potentiometers and including electron emission means having cathode and grid electrodes; a relatively low impedance input circuit including said potentiometers connected to said cathode and grid electrodes; a rectifier in said bridge output circuit connected to apply an overriding negative potential to said grid upon bridge unbalance; a source of D. C. potential; and a high impedance input circuit including said potential source, the positive side of said source being connected to said cathode and the negative side to said grid, said high impedance circuit being in parallel with said low impedance circuit and normally inactive, but activated upon disruption of the low impedance circuit to apply an overriding negative potential to said grid.

11. Remote control mechanism, comprising: an electronic control circuit for an actuating device including electron emission means having grid and cathode electrodes; primary selecting means for determining operational characteristics of said actuating device, said selecting means comprising a selector potentiometer and a follow-up potentiometer, said potentiometers being bridge connected and having variable contacts connected to said cathode so as to form a cathode follower primary control for said device; and an overriding control network responsive to a fault in said bridge circuit including means for applying a cut-off bias voltage to said grid to render said primary control ineffectual.

12. Remote control mechanism, comprising: an electronic control circuit for an actuating device including electron emission means having grid and cathode electrodes; primary selecting means for determining operational characteristics of said actuating device, said selecting means comprising a selector potentiometer and follow-up potentiometer, said potentiometers being bridge connected and having variable contacts connected in circuit with said grid; and an overriding control network responsive to a fault in said bridge circuit including means for applying a cut-off bias voltage to said grid to render the primary control by said potentiometers ineffectual.

13. Remote control mechanism, comprising: an electronic control circuit for an actuating device including electron emission means having grid and cathode electrodes; primary selecting means for determining operational characteristics of said actuating device, said selecting means comprising a selector potentiometer and follow-up potentiometer, said potentiometers being connected to form a first bridge and having variable contacts connected in circuit with said grid; a resistor in said grid circuit between said grid and potentiometer connection; a capacitor shunting said resistor; and a fail safe overriding control network comprising fixed impedance elements connected with said potentiometers to form a second bridge having an output circuit; a rectifier in said output circuit constituting upon unbalance of said second bridge a D. C. potential source having its negative side connected to said grid circuit between said resistor and said grid.

14. A fail-safe circuit for an electronic control system of the type including a signal responsive device having an input control circuit, a selector potentiometer and a follow-up potentiometer, said potentiometers being connected to form a first bridge network and having variable contacts coupled to said input control circuit; said fail-safe circuit including a pair of impedance elements connected to form two arms of a second bridge network, said impedance elements being connected to said potentiometers to form the other two arms of said second bridge network; an output circuit for said second bridge network connected between the junction points of two pairs of arms of said second bridge network; and circuit means coupled to said output circuit for developing a control signal in response to the occurrence of a fault of said second bridge network.

15. A fail-safe circuit for a remote electronic control system of the type including an electron discharge device having input and output electrodes, a selector potentiometer and a follow-up potentiometer, said potentiometers being connected to form a first bridge network and having variable contacts coupled to said input electrodes; said fail-safe circuit including a pair of impedance elements connected to form two arms of a second bridge network, said impedance elements being connected to said potentiometers to form the other two arms of said second bridge network; an output circuit for said second bridge network connected between the junction points of two pairs of arms of said second bridge network; and circuit means coupled between said output circuit and said input electrodes for developing a control signal in response to unbalance of said second bridge network due to a fault and for impressing said signal on said electron discharge device to modify the operation thereof.

References Cited in the file of this patent

UNITED STATES PATENTS

| Number | Name | Date |
|---|---|---|
| 1,942,587 | Whitman | Jan. 9, 1934 |
| 2,020,275 | Beers | Nov. 5, 1935 |
| 2,498,654 | Deakin | Feb. 28, 1950 |

FOREIGN PATENTS

| Number | Country | Date |
|---|---|---|
| 481,517 | Great Britain | Mar. 11, 1938 |
| 552,118 | Great Britain | Mar. 24, 1943 |
| 585,091 | Great Britain | Jan. 30, 1947 |